(12) United States Patent
Oishi

(10) Patent No.: US 9,413,537 B2
(45) Date of Patent: Aug. 9, 2016

(54) INFORMATION UPDATE SYSTEM AND METHOD, VEHICLE, CHARGER AND SERVER APPARATUS

(75) Inventor: Hirokazu Oishi, Shizuoka (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/413,768

(22) PCT Filed: Jul. 11, 2012

(86) PCT No.: PCT/JP2012/067738
§ 371 (c)(1),
(2), (4) Date: Mar. 2, 2015

(87) PCT Pub. No.: WO2014/010050
PCT Pub. Date: Jan. 16, 2014

(65) Prior Publication Data
US 2015/0329005 A1    Nov. 19, 2015

(51) Int. Cl.
*H04L 9/32* (2006.01)
*H04L 29/08* (2006.01)
*B60L 11/18* (2006.01)
*B60L 3/12* (2006.01)
(Continued)

(52) U.S. Cl.
CPC ............. *H04L 9/3247* (2013.01); *B60L 3/12* (2013.01); *B60L 11/1809* (2013.01); *B60L 11/1816* (2013.01); *B60L 11/1846* (2013.01); *G01C 21/32* (2013.01); *G08G 1/20* (2013.01); *H04L 67/10* (2013.01); *B60L 2230/40* (2013.01); *B60L 2240/622* (2013.01); *B60L 2240/72* (2013.01); *H04L 9/3263* (2013.01); *H04L 2209/84* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01);
(Continued)

(58) Field of Classification Search
None
See application file for complete search history.

(56) References Cited

U.S. PATENT DOCUMENTS

| 2007/0124064 A1 | 5/2007 | Fukui et al. |
| 2010/0070772 A1 | 3/2010 | Nakamura et al. |

FOREIGN PATENT DOCUMENTS

| JP | 2006-133541 | 5/2006 |
| JP | 2007-147567 | 6/2007 |

(Continued)

OTHER PUBLICATIONS

International Search Report PCT/JP2012/067738 dated Sep. 25, 2012.

*Primary Examiner* — Thomas Tarcza
*Assistant Examiner* — Garrett Evans
(74) *Attorney, Agent, or Firm* — Young & Thompson

(57) ABSTRACT

An information update system is provided with a vehicle (10), a plurality of charger (20), and a server apparatus (30). The vehicle applies a first signature to position information associated with the vehicle, and transmits to a charger when a battery is charged. The charger applies a second signature to the position information with the first signature applied thereto. The charger further transmits, to the vehicle, identification information associated with the charger with a third signature applied thereto. The vehicle further applies a fourth signature to the identification information. The vehicle or the charger transmits to the server apparatus the position information with the first signature and the second signature applied thereto, and the identification information with the third signature and the fourth signature applied thereto. The server apparatus updates stored position information on the basis of the transmitted position information and the transmitted identification information.

8 Claims, 7 Drawing Sheets

(51) Int. Cl.
*G01C 21/32* (2006.01)
*G08G 1/00* (2006.01)

(52) U.S. Cl.
CPC .............. *Y02T 90/161* (2013.01); *Y02T 90/162* (2013.01); *Y02T 90/163* (2013.01); *Y02T 90/169* (2013.01); *Y04S 30/14* (2013.01)

(56) References Cited

FOREIGN PATENT DOCUMENTS

| | | |
|---|---|---|
| JP | 2008-175648 | 7/2008 |
| JP | 2011-086020 | 4/2011 |
| JP | 2011-252957 | 12/2011 |

INFORMATION UPDATE SYSTEM AND METHOD, VEHICLE, CHARGER AND SERVER APPARATUS

TECHNICAL FIELD

The present invention relates to an information, update system and method which updates information associated with a charging infrastructure for a vehicle such as, for example, an electric vehicle.

BACKGROUND ART

As this type of system, for example, there is proposed a system which receives position information indicating a position of a terminal apparatus and map update information from the terminal apparatus, which transmits a request for confirming the map update information to another terminal apparatus if the received map update information is different from map information stored in advance, and which updates the map information stored in advance if a confirmation report for the confirmation request is received from the another terminal apparatus (refer to Patent Literature 1).

Alternatively there is proposed a system which provides an electric vehicle with charging infrastructure information. Here, in particular, there is proposed a technology in which if it is determined, on the basis of charging detection information associated with the electric vehicle and user information of the electric information, that a charging detection point included in the charging detection information satisfies a predetermined condition, then, the point is registered as a charging facility (refer to Patent Literature 2).

CITATION LIST

Patent Literature

Patent Literature 1: Japanese Patent Application Laid Open No. 2007-147567
Patent Literature 2: Japanese Patent Application Laid Open No. 2011-086020

SUMMARY OF INVENTION

Technical Problem

The aforementioned background art, however, has such a technical problem that it is hard to confirm the genuineness of information provided from a user (or each terminal apparatus or each electric vehicle in the background art).

It is therefore an object of the present invention to provide an information update system and method, a vehicle, a charger and a server apparatus which can relatively easily confirm the genuineness of information provided from a user and which can update information associated with a charging infrastructure for the vehicle on the basis of the information provided from the user.

Solution to Problem

The above object of the present invention can be achieved by an information update system provided with a vehicle on which a battery is mounted, a plurality of charger each of which can charge the battery and each of which can communicate with the vehicle, and a server apparatus configured to store therein position information associated with each of the plurality of chargers, wherein the vehicle obtains position information associated with the vehicle when the battery is charged by one of the plurality of chargers and applies a first signature to the obtained position information, the vehicle further transmits to the one charger the position information with the first signature applied thereto, the one charger applies a second signature to the position information with the first signature applied thereto, the one charger further transmits, to the vehicle, identification information associated with the one charger with a third signature applied thereto, the vehicle further applies a fourth signature to the identification information with the third signature applied thereto, the vehicle or the one charger transmits to the server apparatus the position information with the first signature anal the second signature applied thereto, and the identification information with the third signature and the fourth signature applied thereto, via a network, and the server apparatus updates the stored position information on the basis of the position information with the first signature and the second signature applied thereto and the identification information with the third signature an the fourth signature applied thereto.

The above object of the present invention can be achieved by an information update method in an information update system provided with a vehicle on which a battery is mounted, a plurality of charger each of which can charge the battery and each of which can communicate with the vehicle, and a server apparatus configured to store therein position information associated with each of the plurality of chargers, said information update method is provided with processes of: the vehicle obtains position information associated with the vehicle when the battery is charged by one of the plurality of chargers and applies a first signature to the obtained position information; the vehicle transmits to the one charger the position information with the first signature applied thereto; the one charger applies a second signature to the position information with the first signature applied thereto; the one charger further transmits, to the vehicle, identification information associated with the one charger with a third signature applied thereto; the vehicle further applies a fourth signature to the identification information with the third signature applied thereto; the vehicle or the one charger transmits to the server apparatus the position information with the first signature and the second signature applied thereto, and the identification information with the third signature and the fourth signature applied thereto, via a network; and the server apparatus updates the stored position information on the basis of the position information with the first signature and the second signature applied thereto and the identification information with the third signature and the fourth signature applied thereto.

The above object of the present invention can be achieved by a vehicle in an information update system provided with the vehicle on which a battery is mounted, a plurality of charger each of which can charge the battery and each of which can communicate with the vehicle, and a server apparatus configured to store therein position information associated with each of the plurality of chargers, said vehicle is provided with: a position information obtaining device configured to obtain position information associated with the vehicle when the battery is charged by one of the plurality of chargers; a signature applying device configured to apply a first signature to the obtained position information; a transmitting device configured to transmit to the one charger the position information with the first signature applied thereto; and an obtaining device configured to obtain the position information with the first signature applied thereto to which a second signature is further applied by the one charger, wherein the obtaining device obtains identification information associated with the one charger with a third signature applied thereto by the one charger, the signature applying device applies a fourth signature to the identification information with the third signature applied thereto, and the transmitting device transmits to the server apparatus the position information with the first signature and the second signature applied thereto, and the identification information with the third signature and the fourth signature applied thereto, via a network.

The above object of the present invention can be achieved by a charger of a plurality of chargers in an information update system provided with a vehicle on which a battery is mounted, the plurality of charger each of which can charge the battery and each of which can communicate with the vehicle, and a server apparatus configured to store therein position information associated with each of the plurality of chargers, said charger is provided with: an obtaining device configured to obtain position information associated with the vehicle with a first signature applied thereto by the vehicle: a signature applying device configured to apply a second signature to the position information with the first signature applied thereto; and a transmitting device configured to transmit, to the vehicle, identification information associated with the one charger with a third signature applied thereto, wherein the obtaining device obtains the identification information with the third signature applied thereto to which a fourth signature is applied by the vehicle, the transmitting device applies the fourth signature to the identification information with the third signature applied thereto, and the transmitting device transmits to the server apparatus the position information with the first signature and the second signature applied thereto, and the identification information with the third signature and the fourth signature applied thereto, via a network.

The above object of the present invention can be achieved by a server apparatus in an information update system provided with a vehicle on which a battery is mounted, a plurality of charger each of which can charge the battery and each of which can communicate with the vehicle, and the server apparatus configured to store therein position information associated with each of the plurality of chargers, said server apparatus is provided with: an obtaining device configured to obtain position information associated with the vehicle with a first signature by the vehicle and a second signature by one of the plurality of chargers applied thereto, and identification information associated with the one charger with a third signature by the one charger and a fourth signature by the vehicle applied thereto; and an updating device configured to update the stored position information on the basis of the position information with the first signature and the second signature applied thereto and the identification information with the third signature and the fourth signature applied thereto.

The operation and other advantages of the present invention will become more apparent from embodiments and examples explained below.

DESCRIPTION OF EMBODIMENTS

Figure 1A:
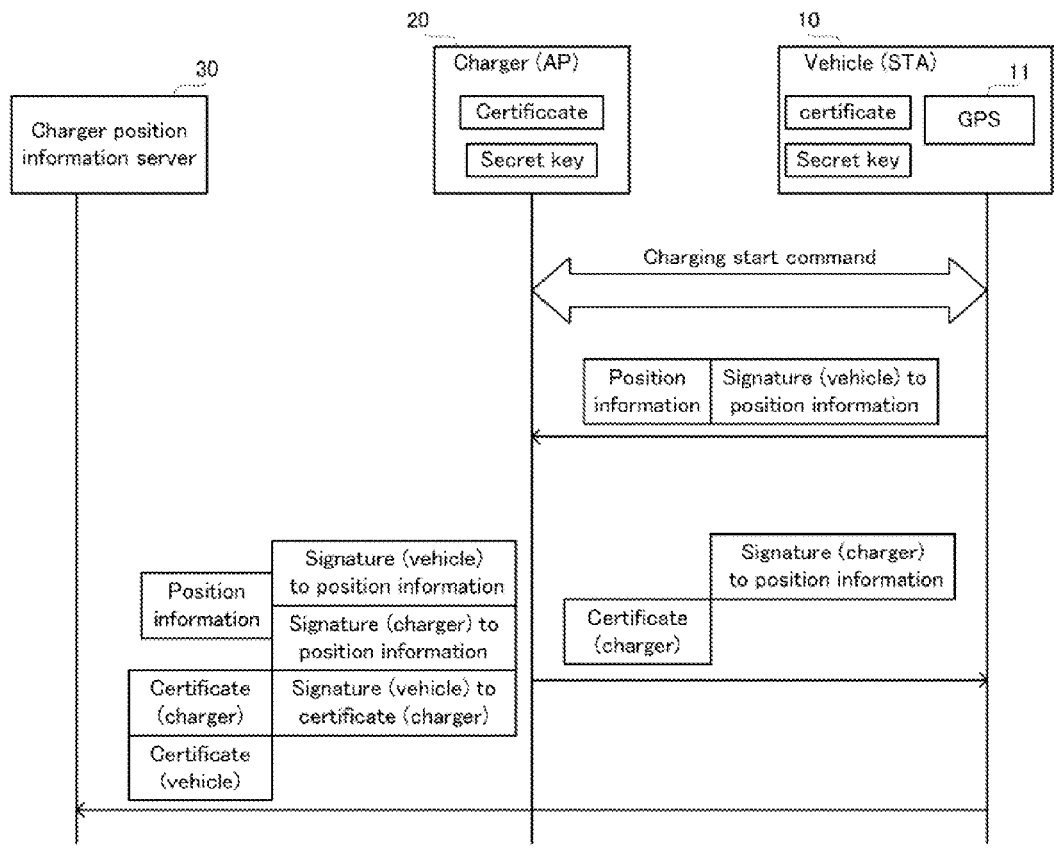
FIG. 1 is a sequence diagram illustrating a position registration process in a first example.

Embodiments of the information update system and the like of the present invention will be explained.

(Embodiment of Information Update System)

The information update system in an embodiment is an information update system provided with a vehicle on which a battery is mounted, a plurality of charger each of which can charge the battery and each of which can communicate with the vehicle, and a server apparatus configured to store therein position information associated with each of the plurality of chargers, wherein the vehicle obtains position information associated with the vehicle when the battery is charged by one of the plurality of chargers and applies a first signature to the obtained position information, the vehicle further transmits to the one charger the position information with the first signature applied thereto, the one charger applies a second signature to the position information with the first signature applied thereto, the one charger further transmits, to the vehicle, identification information associated with the one charger with a third signature applied thereto, the vehicle further applies a fourth signature to the identification information with the third signature applied thereto, the vehicle or the one charger transmits to the server apparatus the position information with the first signature and the second signature applied thereto, and the identification information with the third signature and the fourth signature applied thereto, via a network, and the server apparatus updates the stored position information on the basis of the position information with the first signature and the second signature applied thereto and the identification information with the third signature and the fourth signature applied thereto.

The information update system in the embodiment is provided with the vehicle, the plurality of chargers, and the server apparatus. The vehicle such as, for example, an electric vehicle is provided with the battery, a global positioning system (GPS), a communication apparatus, and the like.

Each of the plurality of chargers can charge the battery mounted on the vehicle. The battery may be charged via a charging cable or in a wireless manner. Moreover, each of the plurality of chargers can communicate with the vehicle in a wired or wireless manner.

The server apparatus stores therein the position information associated with each of the plurality of chargers. The server apparatus is disposed on a wide area network such as, for example, the Internet.

The vehicle obtains the position information associated with the vehicle when the battery is charged by one of the plurality of chargers. The vehicle applies the first signature, which is a signature of the vehicle, to the obtained position information. The vehicle transmits to the one charger the position information with the first signature applied thereto. Various known aspects can be applied to the "signature", and thus, an explanation of the details thereof will be omitted.

The one charger which receives the position information with the first signature applied thereto applies the second signature, which is a signature of the one charger, to the position information with the first signature applied thereto. Moreover, the one charger transmits to the vehicle the identification information associated with the one charger with the third signature, which is a signature of the one charger, applied thereto.

The vehicle which receives the identification information with the third signature applied thereto applies the fourth signature, which is a signature of the vehicle, to the identification information with the third signature applied thereto.

Here, if the one charger is not connected to the network on which the server apparatus is disposed, the position information and the identification information associated with the one charger are transmitted from the vehicle to the server apparatus. In this case, the one charger transmits to the vehicle the position information with the first signature and the second signature applied thereto. The vehicle transmits to the server apparatus the position information with the first signature and the second signature applied thereto, and the identification information associated with the one charger with the third signature and the fourth signature applied thereto.

On the other hand, if the one charger is connected to the network on which the server apparatus is disposed, the position information and the identification information associated with the one charger are transmitted from the one charger to the server apparatus. In this case, the vehicle transmits to the one charger the identification information with the third signature and the fourth signature applied thereto. The one charger transmits to the server apparatus the position information with the first signature and the second signature applied thereto, and the identification information associated with the one charger with the third signature and the fourth signature applied thereto.

The server apparatus updates the stored position information on the basis of the position information with the first signature and the second signature applied thereto and the identification information with the third signature and the fourth signature applied thereto. Particularly in the embodiment, both the signature of the vehicle and the signature of the one charger are applied to each of the position information and the identification information. It is therefore possible to easily recognize forged information in the absence of either of the position information and the identification information.

Therefore, according to the information update system in the embodiment, it is possible to relatively easily confirm the genuineness of information provided from a user, and to update the information associated with a charging infrastructure for the vehicle, on the basis of the information provided from the user.

In one aspect of the information update system in the embodiment, the vehicle further transmits, to the one charger, identification information associated with the vehicle with a fifth signature applied thereto, the one charger further applies a sixth signature to the identification information with the fifth signature applied thereto, and the vehicle or the one charger further transmits to the server apparatus the identification information with the fifth signature and the sixth signature applied thereto, via the network.

According to this aspect, for example, it is possible to change weighting to the position information from the vehicle which has large errors associated with the position information. This results in an improvement in accuracy of the position information, which is extremely useful in practice.

(Embodiment of Information Update Method)

The information update method in an embodiment is an information update method in an information update system provided with a vehicle on which a battery is mounted, a plurality of charger each of which can charge the battery and each of which can communicate with the vehicle, and a server apparatus configured to store therein position information associated with each of the plurality of chargers, said information update method is provided with processes of: the vehicle obtains position information associated with the vehicle when the battery is charged by one of the plurality of chargers and applies a first signature to the obtained position information; the vehicle transmits to the one charger the position information with the first signature applied thereto; the one charger applies a second signature to the position information with the first signature applied thereto; the one charger further transmits, to the vehicle, identification information associated with the one charger with a third signature applied thereto; the vehicle further applies a fourth signature to the identification information with the third signature applied thereto; the vehicle or the one charger transmits to the server apparatus the position information with the first signature and the second signature applied thereto, and the identification information with the third signature and the fourth signature applied thereto, via a network; and the server apparatus updates the stored position information on the basis of the position information with the first signature and the second signature applied thereto and the identification information with the third signature and the fourth signature applied thereto.

According to the information update method in the embodiment, as in the information update system in the embodiment described above, it is possible to relatively easily confirm the genuineness of the information provided from the user, and to update the information associated with the charging infrastructure for the vehicle, on the basis of the information provided from the user.

(Embodiment of Vehicle)

The vehicle in an embodiment is a vehicle in an information update system provided with the vehicle on which a battery is mounted, a plurality of charger each of which can charge the battery and each of which can communicate with the vehicle, and a server apparatus configured to store therein position information associated with each of the plurality of chargers, said vehicle is provided with: a position information obtaining device configured to obtain position information associated with the vehicle when the battery is charged by one of the plurality of chargers; a signature applying device configured to apply a first signature to the obtained position information; a transmitting device configured to transmit to the one charger the position information with the first signature applied thereto; and an obtaining device configured to obtain the position information with the first signature applied thereto to which a second signature is further applied by the one charger, wherein the obtaining device obtains identification information associated with the one charger with a third signature applied thereto by the one charger, the signature applying device applies a fourth signature to the identification information with the third signature applied thereto, and the transmitting device transmits to the server apparatus the position information with the first signature and the second signature applied thereto, and the identification information with the third signature and the fourth signature applied thereto, via a network.

According to the vehicle in the embodiment, the position information obtaining device, which is provided, for example, with a memory a processor and the like, obtains the position information associated with the vehicle when the battery mounted on the vehicle is charged by the one charger.

The signature applying device, which is provided, for example, with a memory, a processor and the like, applies the first signature, which is a signature of vehicle, to the obtained position information. The transmitting device transmits to the one charger the position information with the first signature applied thereto.

The obtaining device, which is provided, for example, with a memory, a processor and the like, obtains the position information to which the second signature, which is a signature of the one charger, is further applied by the one charger (i.e. the position information with the first signature and the second signature applied thereto).

The obtaining device further obtains the identification information associated with the one charger with the third signature, which is a signature of the one charger, applied thereto. The signature applying device applies the fourth signature, which is a signature of the vehicle, to the identification information with the third signature applied thereto.

The transmitting device transmits to the server apparatus the position information with the first signature and the second signature applied thereto, and the identification information with the third signature and the fourth signature applied thereto, via the network.

If the stored position information is updated on the server apparatus on the basis of the position information with the first signature and the second signature applied thereto and the identification information associated with the one charger with the third signature and the fourth signature applied thereto, it is then possible to update the information associated with the charging infrastructure for the vehicle, on the basis of the information provided from the user. In addition, it is possible to relatively easily confirm the genuineness of the information provided from the user, because both the signature of the vehicle and the signature of the one charger are applied to each of the position information and the identification information.

In one aspect of the vehicle in the embodiment, the position information obtaining device has an offset detecting device configured to detect an offset amount between the vehicle and the one charger, and the position information obtaining device obtains a value obtained by adding the detected offset amount to coordinates of the vehicle, as the position information associated with the vehicle.

According to this aspect, if a parking position of the vehicle and a control apparatus of the charger are relatively separated from each other, for example, as in a large-scale charging station provided with a plurality of chargers, it is then possible to suppress a variation in the position of the charger due to the parking position of the vehicle.

In another aspect of the vehicle in the embodiment, the position information obtaining device successively obtains the position information associated with the vehicle, and the position information obtaining device sets latest obtained position information as the position information when the battery is charged by the one charger, if the position information associated with the vehicle cannot be obtained when the battery is charged by the one charger.

According to this aspect, it is possible to update the position information stored in the server apparatus even if the charger is disposed under the ground or the like in which the parking position of the vehicle cannot be obtained.

(Embodiment of Charger)

The vehicle in an embodiment is a charger of a plurality of chargers in an information update system provided with a vehicle on which a battery is mounted, the plurality of charger each of which can charge the battery and each of which can communicate with the vehicle, and a server apparatus configured to store therein position information associated with each of the plurality of chargers, said charger is provided with: an obtaining device configured to obtain position information associated with the vehicle with a first signature applied thereto by the vehicle; a signature applying device configured to apply a second signature to the position information with the first signature applied thereto; and a transmitting device configured to transmit, to the vehicle, identification information associated with the one charger with a third signature applied thereto, wherein the obtaining device obtains the identification information with the third signature applied thereto to which a fourth signature is applied by the vehicle, the transmitting device applies the fourth signature to the identification information with the third signature applied thereto, and the transmitting device transmits to the server apparatus the position information with the first signature and the second signature applied thereto, and the identification information with the third signature and the fourth signature applied thereto, via a network.

According to the charger in the embodiment, as in the information update system in the embodiment described above, it is possible to relatively easily confirm the genuineness of the information provided from the user, and to update the information associated with the charging infrastructure for the vehicle, on the basis of the information provided from the user.

(Embodiment of Server Apparatus)

The server apparatus in an embodiment is a server apparatus in an information update system provided with a vehicle on which battery is mounted, a plurality of charger each of which can charge the battery and each of which can communicate with the vehicle, and the server apparatus configured to store therein position information associated with each of the plurality of chargers, said server apparatus is provided with an obtaining device configured to obtain position information associated with the vehicle with a first signature by the vehicle and a second signature by one of the plurality of chargers applied thereto, and identification information associated with the one charger with a third signature by the one charger and a fourth signature by the vehicle applied thereto; and an updating device configured to update the stored position information on the basis of the position information with the first signature and the second signature applied thereto and the identification information with the third signature and the fourth signature applied thereto.

According to the server apparatus in the embodiment, as in the information update system in the embodiment described above, it is possible to relatively easily confirm the genuineness of the information provided from the user, and to update the information associated with the charging infrastructure for the vehicle, on the basis of the information provided from the user.

EXAMPLES

Examples of the information update system of the present invention will be explained with reference to the drawings.

First Example

A first example of the information update system of the present invention will be explained with reference to FIG. 1. FIG. 1 is a sequence diagram illustrating a position registration process in the first example.

In FIG. 1, an information update system is provided with a vehicle 10, a charger 20 and a charger position information server 30. In the example, the vehicle 10 and the charger position information server 30 are connected to each other via a network. On the other hand, the charger 20 is of a standalone type (i.e. is not connected to the network).

The vehicle 10 is provided with a GPS 11, a battery (not illustrated) for driving the vehicle 10, a storage apparatus (not illustrated) configured to store therein a certificate and a secret key associated with the vehicle 10, and a wireless communication apparatus (not illustrated) which complies with a standard such as, for example, 3rd Generation (3G).

Figure 1B:
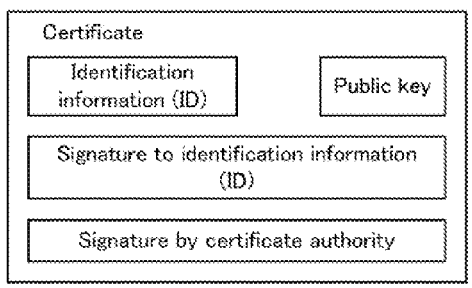

The certificate of the vehicle 10 (e.g. refer to FIG. 1(b)) includes identification information (ID) associated with the vehicle 10, a public key, a signature to the identification information by the secret key, and a signature by a certificate authority. The certificate and the secret key associated with the vehicle 10 are issued after confirmation of accuracy of a position information detection function by the GPS 11.

The vehicle 20 is configured to supply electric power to the battery mounted on the vehicle 10, via a charging cable or in a wireless manner. The charger 20 is provided with a storage apparatus (not illustrated) configured to store therein a certificate (e.g. refer to FIG. 1(b) and a secret key. The certificate of the charger 20 includes identification information (ID) associated with the charger 20, a public key, a signature to the identification information by the secret key, and a signature by a certificate authority.

The certificate and the secret key of the vehicle 10, and the certificate and the secret key of the charger 20 may be also used as a certificate and a secret key for another application, such as, for example, a certificate and a secret key for authentication for performing charging control data communication.

The charger position information server 30 is disposed on the network and is provided with a storage apparatus (not illustrated) configured to store therein position information about each of a plurality of chargers. The charger position information server 30 may be a public institution server or a private enterprise server.

If a charging start command is issued by a user operating the charger 20 after the vehicle 10 is disposed in a predetermined parking space of a charging station, the GPS 11 of the vehicle 10 obtains position information about the vehicle 10 upon the issuance of the charging start command. The GPS 11 typically obtains the position information about the vehicle 10, successively.

Moreover, in a relatively large charging station, the plurality of chargers (or charging spots) are controlled by one control apparatus. In this case, the setting of the position information about the vehicle 10 to the position information about the charger 20 causes a relatively large variation in the position information, which is technically problematic.

Figure 2:
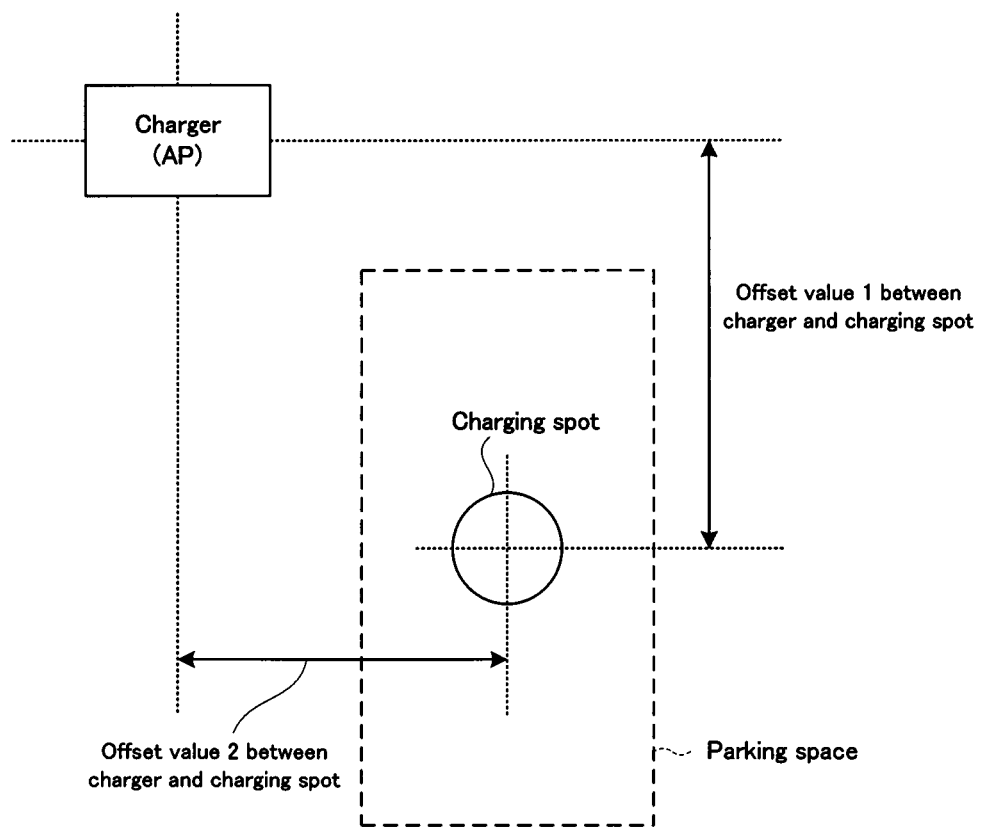
FIG. 2 is a conceptual diagram illustrating a concept of an offset amount.

Thus, in this case, a value which is obtained by adding an offset amount between the charging spot and the control apparatus ("charger (AP)" in FIG. 2) to the position information about the vehicle 10 obtained by the GPS 11 may be set as the position information about the vehicle 10. FIG. 2 is a conceptual diagram illustrating a concept of the offset amount.

Then, the vehicle 10 applies a signature (or "signature (vehicle) to position information": corresponding to the "first signature" of the present invention) to the position information about the vehicle 10 obtained by the GPS 11. The "signature" is obtained, for example, by hashing data (or "position information" herein) with the secret key. The vehicle 10 then transmits to the charger 20 the position information with the signature of the vehicle 10 applied thereto. The vehicle 10 and the charger 20 communicate with each other, for example, by Wi-Fi (registered trademark) or the like.

Here, if the charging station is placed in a building such as, for example, a multistory parking space and an apartment, and if the position information about the vehicle 10 cannot be obtained by the GPS 11, the vehicle 10 applies the signature of the vehicle 10 to the latest obtained position information about the vehicle 10 before the issuance of the charging start command, and transmits it to the charger 20.

The charger 20 applies a signature (or "signature (charger) to position information": corresponding to the "second signature" of the present invention) to the position information with the signature of the vehicle 10 applied thereto. The charger 20 then transmits to the vehicle 10 the position information with the signature of the vehicle 10 and the signature of the charger 20 applied thereto, and the certificate of the charger 20 (or "certificate (charger)": corresponding to the "identification information with the third signature applied thereto" of the present invention).

The vehicle 10 applies a signature (or "signature (vehicle) to certificate (charger)": corresponding to the "fourth signature" of the present invention) to the certificate of the charger 20. The vehicle 10 then transmits to the charger position information server 30 the position information with the signature of the vehicle 10 and the signature of the charger 20 applied thereto, the certificate of the charger 20 with the signature of the vehicle 10 applied thereto, and the certificate (or "certificate (vehicle)") of the vehicle 10.

The charger position information server 30 updates the stored position information corresponding to the charger 20, on the basis of the position information with the signature of the vehicle 10 and the signature of the charger 20 applied thereto and the certificate of the charger 20 with the signature of the vehicle 10 applied thereto.

Here, the update of the position information is not performed by simply overwriting with new position information, but a simple average or a weighted average of the stored position information and the new position information is set as the position information after the update. There is a variation in parking position of the vehicle 10, and measured values by the GPS 11 have errors. It is thus possible to improve the accuracy of the position of the charger 20 by obtaining the average of the position information.

As described above, the signature of the vehicle 10 and the signature of the charger 20 are applied to the position information. Moreover, the signature of the vehicle 10 and the signature of the charger 20 are also applied to the identification information (certificate) of the charger 20. Thus, if it is determined whether or not there is the signature, whether or not the signature applied to the position information corresponds to the signature applied to the identification information, or the like, it is possible to relatively easily determine the genuineness of the position information and the identification information.

If it is determined that at least one of the position information and the identification information is forged, the charger position information server 30 destroys the position information and the identification information. In order to suppress a load of the charger position information server 30, a plurality of servers (not illustrated) may perform a variance statistical process and a result of the variance statistical process may be registered in the charger position information server 30.

The "vehicle 10", the "GPS 11" and the "charger position information server 30" in the example are one example of the "vehicle", the "position information obtaining device" and the "server apparatus" of the present invention, respectively.

Second Example

Figure 3:
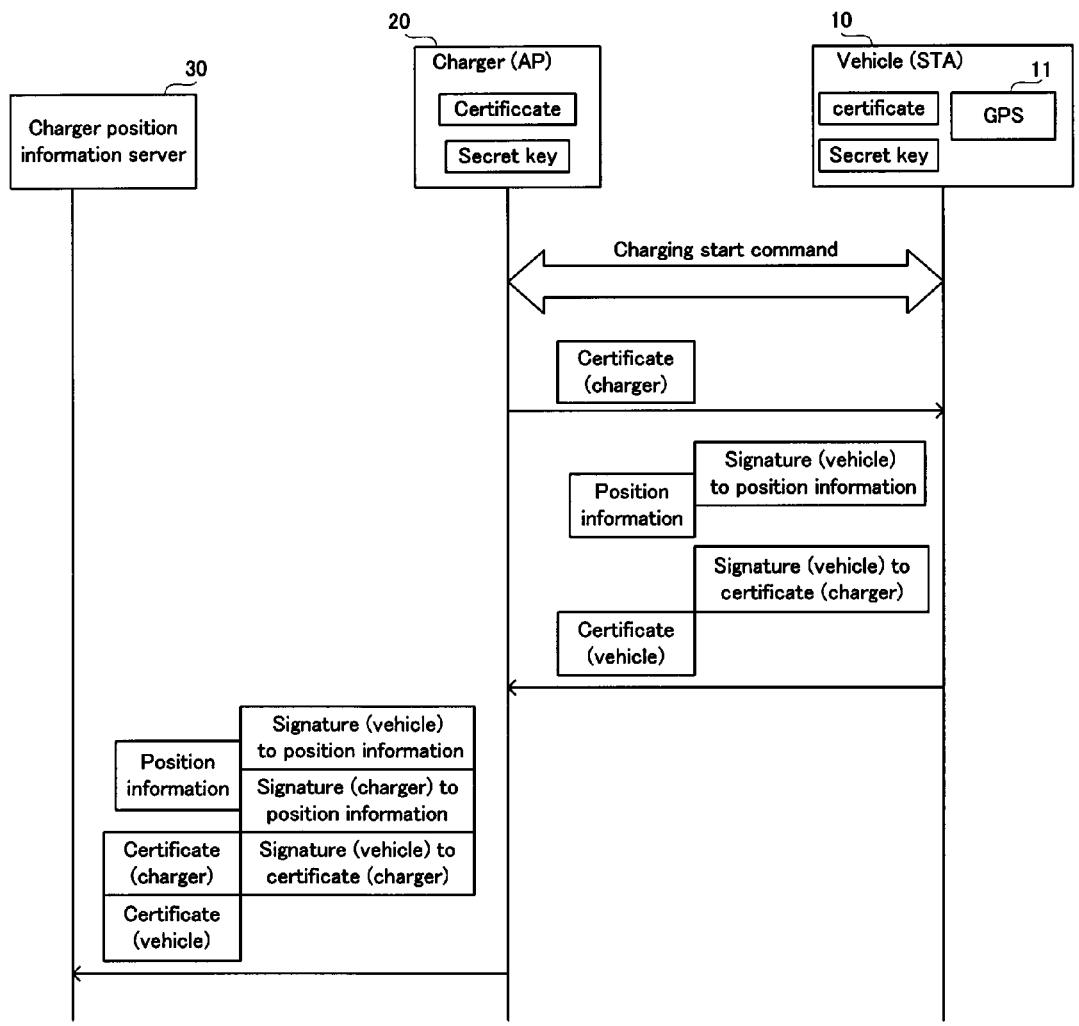
FIG. 3 is a sequence diagram illustrating a position registration process in a second example.

A second example of the information update system of the present invention will be explained with reference to FIG. 3. FIG. 3 is a sequence diagram illustrating a position registration process in the second example. In the second example, a repetitive explanation of the first example will be omitted as occasion demands. In the example, each of the vehicle 10 and the charger 20 is connected to the charger position information server 30 via a network. In the example, the position information and the identification information about the charger 20 are transmitted from the charger 20 to the charger position information server 30.

In FIG. 3, after the issuance of the charging start command, the charger 20 transmits the certificate of the charger 20 (or "certificate (charger)") to the vehicle 10. The vehicle 10 applies the signature (or "signature (vehicle) to certificate (charger)") to the certificate of the charger 20.

The vehicle 10 then transmits to the charger 20 the position information about the vehicle 10 with the signature of the vehicle 10 (or "signature (vehicle) to position information") applied thereto, the certificate of the charger 20 with the signature of the vehicle 10 applied thereto, and the certificate of the vehicle 10 (or "certificate (vehicle)").

The charger 20 then applies the signature (or "signature (charger) to position information") to the position information with the signature of the vehicle 10 applied thereto. The charger 20 then transmits to the charger position information 30 the position information with the signature of the vehicle 10 and the signature of the charger 20 applied thereto, the certificate of the charger 20 with the signature of the vehicle 10 applied thereto, and the certificate of the vehicle 10.

Third Example

Figure 4:
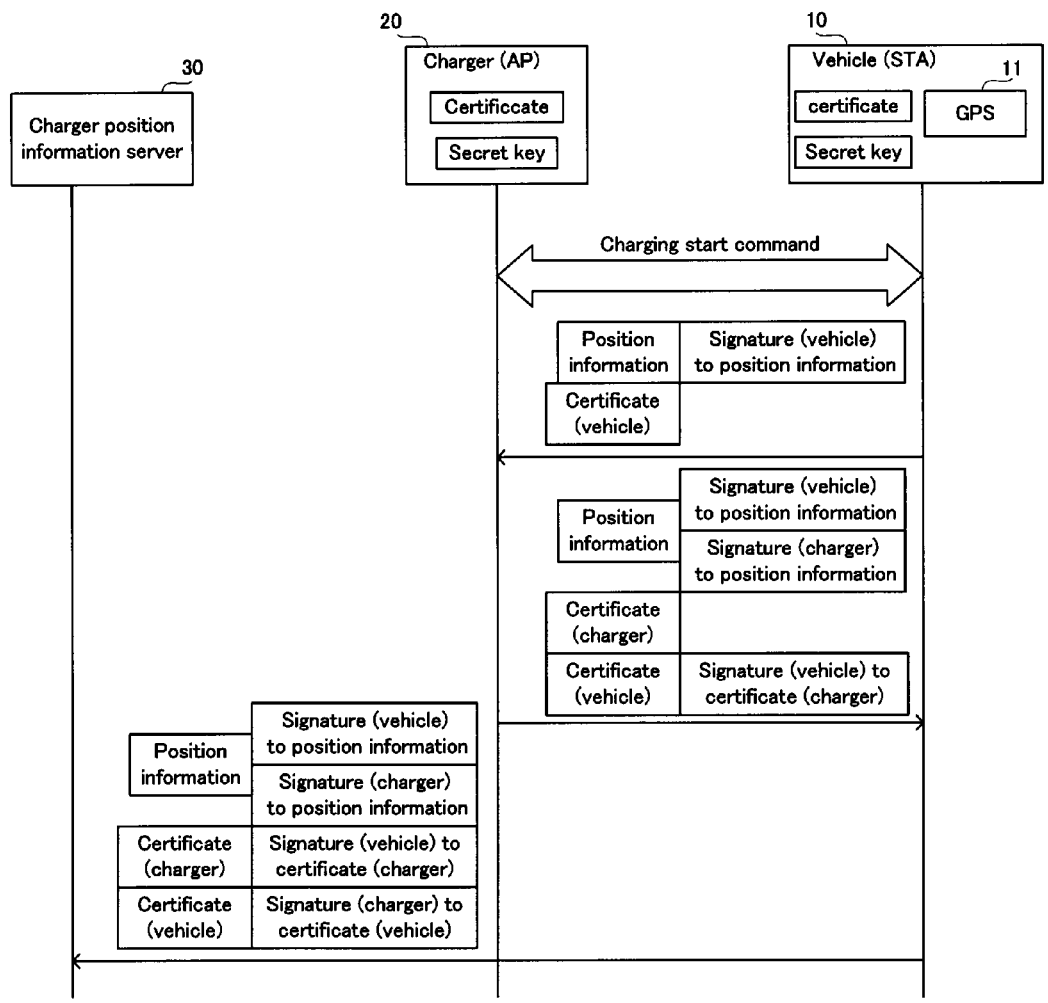
FIG. 4 is a sequence diagram illustrating a position registration process in a third example.

A third example of the information update system of the present invention will be explained with reference to FIG. 4. FIG. 4 is a sequence diagram illustrating a position registration process in the third example. In the third example, a repetitive explanation of the first example will be omitted as occasion demands. In the example, the charger 20 is of the standalone type.

In FIG. 4, after the issuance of the charging start command, the vehicle 10 transmits to the charger 20 the position information with the signature of the vehicle 10 (or "signature (vehicle) to position information") applied thereto, and the certificate of the vehicle 10 (or "certificate (vehicle): corresponding to the "identification information with the fifth signature applied thereto" of the present invention).

The charger 20 applies the signature (or "signature (charger) to position information") to the position information with the signature of the vehicle 10 applied thereto, and applies a signature (or "signature (charger) to certificate (vehicle)": corresponding to the "sixth signature" of the present invention) to the certificate of the vehicle 10.

The charger 20 then transmits to the vehicle 10 the position information with the signature of vehicle 10 and the signature of the charger 20 applied thereto, the certificate of the vehicle 10 with the signature of the charger applied thereto, and the certificate of the charger 20.

The vehicle 10 applies the signature (or "signature (vehicle) to certificate (vehicle)") to the certificate of the charger 20. The vehicle then transmits to the charger position information server 30 the position information with the signature of the vehicle 10 and the signature of the charger 20 applied thereto, the certificate of the charger 20 with the signature of the vehicle 10 applied thereto, and the certificate of the vehicle 10 with the signature of the charger applied thereto.

As a result, for example, if there is a relatively large variation in the position information measured by one vehicle, the position information measured by the one vehicle is destroyed, and a signal indicating "a possible failure of position measurement" is transmitted to the one vehicle, by which a user's attention can be drawn.

Fourth Example

Figure 5:
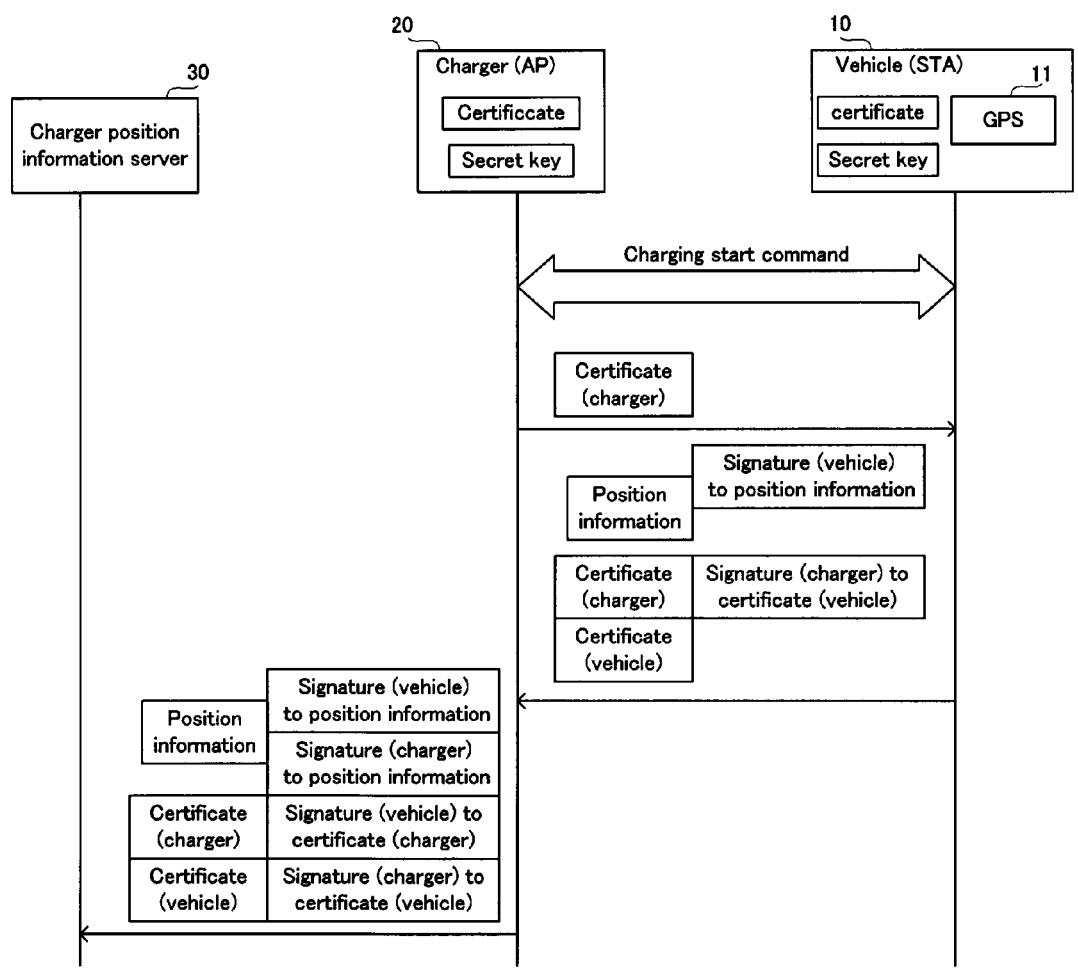
FIG. 5 is a sequence diagram illustrating a position registration process in a fourth example.

A fourth example of the information update system of the present invention will be explained with reference to FIG. 5. FIG. 5 is a sequence diagram illustrating a position registration process in the fourth example. In the fourth example, a repetitive explanation of the third example will be omitted as occasion demands. In the example, each of the vehicle 10 and the charger 20 is connected to the charger position information server 30 via a network. In the example, the position information and the identification information about the charger 20 are transmitted the charger 20 to the charger position information server 30.

In FIG. 5, after the issuance of the charging start command, the charger 20 transmits the certificate of the charger 20 (or "certificate (charger)") to the vehicle 10. The vehicle 10 applies the signature (or "signature (vehicle) to certificate (charger)") to the certificate of the charger 20.

The vehicle 10 then transmits to the charger 20 the position information about the vehicle 10 with the signature of the vehicle 10 (or "signature (vehicle) to position information") applied thereto, the certificate of the charger 20 with the signature of the vehicle 10 applied thereto, and the certificate of the vehicle 10 (or "certificate (vehicle)").

The charger 20 then applies the signature (or "signature (charger) to position information") to the position information with the signature of the vehicle 10 applied thereto, and applies the signature (or "signature (charger) to certificate (vehicle)") to the certificate of the vehicle 10.

The charger 20 then transmits to the charger position information server 30 the position information with the signature of the vehicle 10 and the signature of the charger 20 applied thereto, the certificate of the charger 20 with the signature of the vehicle 10 applied thereto, and the certificate of the vehicle 10 with the signature of the charger 20 applied thereto.

Fifth Example

Figure 6:
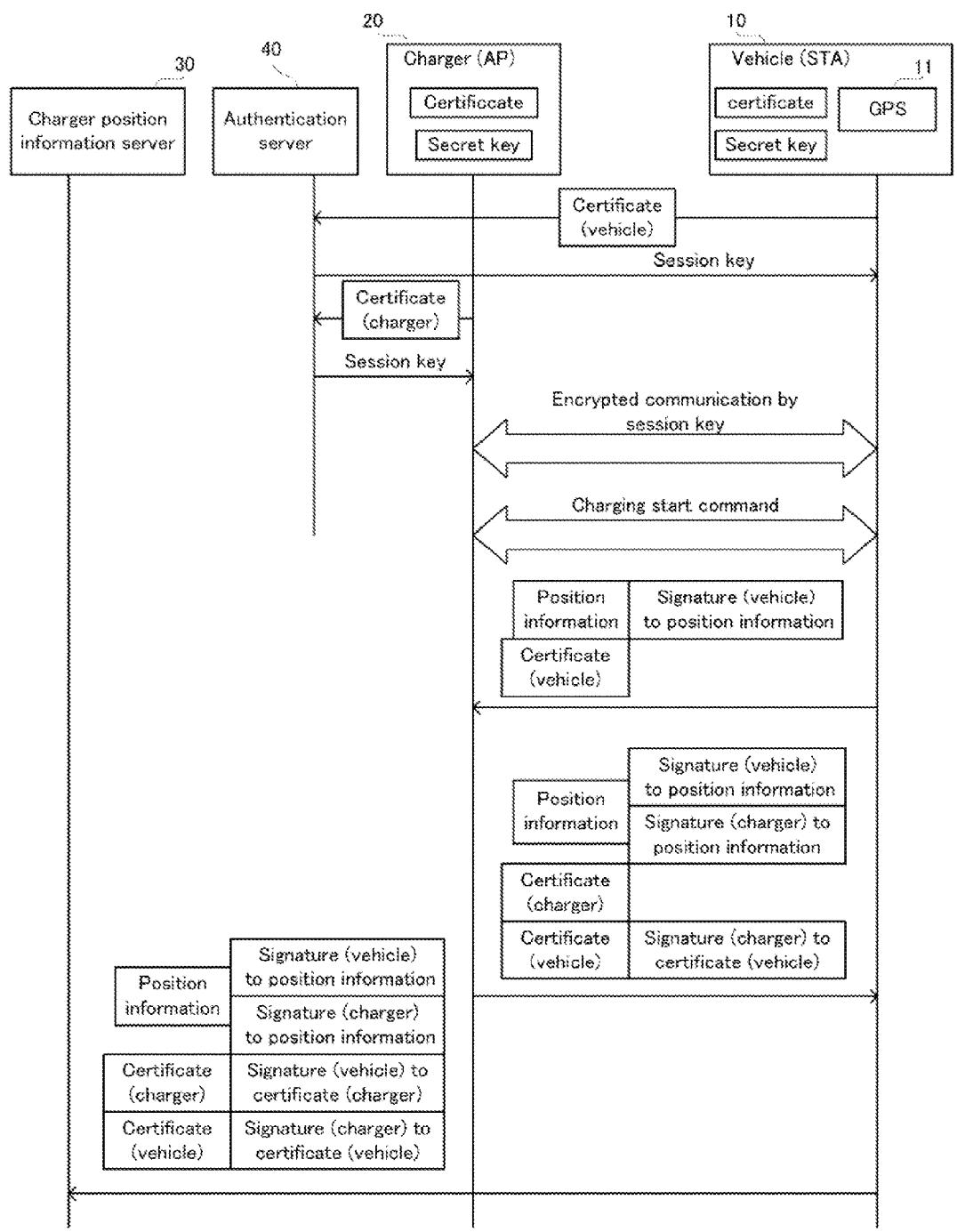
FIG. 6 is a sequence diagram illustrating a position registration process in a fifth example.

A fifth example of the information update system of the present invention will be explained with reference to FIG. 6. FIG. 6 is a sequence diagram illustrating a position registration process in the fifth example. In the fifth example, a repetitive explanation of the third example will be omitted as occasion demands. In the example, the charger 20 is of the standalone type (wherein an authentication server 40 and the charger 20 are connected to each other by a wired network).

As illustrated in FIG. 6, the information update system in the example is provided with the authentication server 40, in addition to the vehicle 10, the charger 20 and the charger position information server 30.

In FIG. 6, the vehicle 10 transmits the certificate of the vehicle 10 (or "certificate(vehicle)") to the authentication server 40 via a network. The authentication server 40 confirms the certificate of the vehicle 10, and then transmits a session key to the vehicle 10.

The charger 20 transmits the certificate of the charger 20 (or "certificate (charger)") to the authentication server 40 via the wired network. The authentication server 40 confirms the certificate of the charger 20, and the transmits the session key to the charger 20.

As a result, the vehicle 10 and the charger 20 can perform encrypted communication using the session key. After the issuance of the charging start command, the vehicle 10 transmits to the charger 20 the position information with the signature of the vehicle 10 (or "signature (vehicle) to position information") applied thereto, and the certificate of the vehicle 10 (or "certificate (vehicle)").

The charger 20 applies the signature (or "signature (charger) to position information") to the position information with the signature of the vehicle 10 applied thereto, and applies the signature (or "signature (charger) to certificate (vehicle)") to the certificate of the vehicle 10.

The charger 20 then transmits to the vehicle 10 the position information with the signature of the vehicle 10 and the signature of the charger 20 applied thereto, the certificate of the vehicle 10 with the signature of the charger 20 applied thereto, and the certificate of the charger 20.

The vehicle 10 applies the signature (or "signature (vehicle) to certificate (charger)") to the certificate of the charger 20. The vehicle 10 then transmits to the charger position information server 30 the position information with the signature of the vehicle 10 and the signature of the vehicle 20 applied thereto, the certificate of the charger 20 with the signature of the vehicle 10 applied thereto, and the certificate of the vehicle 10 with the signature of the charger 20 applied thereto.

Sixth Example

Figure 7:
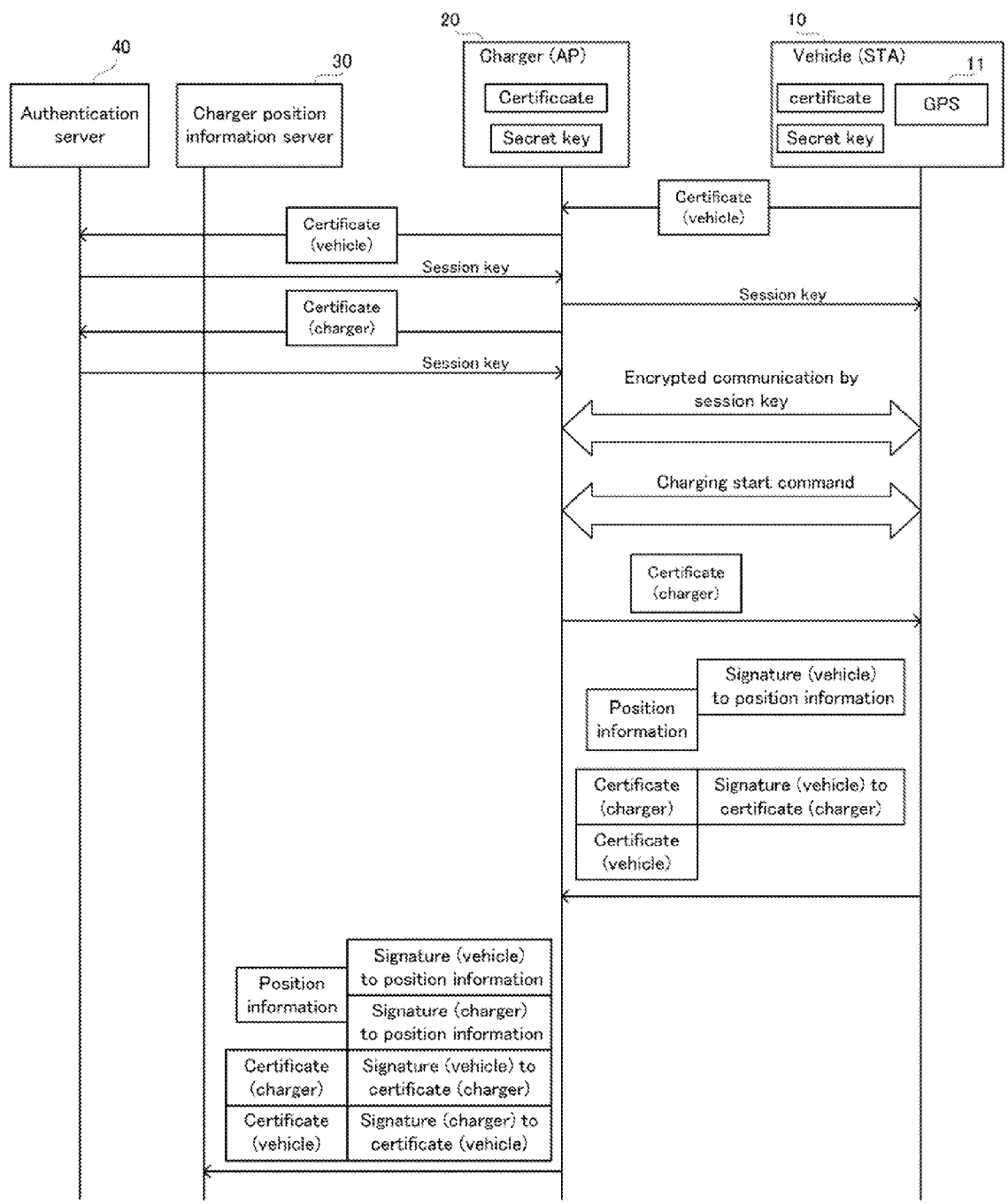
FIG. 7 is a sequence diagram illustrating a position registration process in a sixth example.

A sixth example of the information update system of the present invention be explained with reference to FIG. 7. FIG. 7 is a sequence diagram illustrating a position registration process in the sixth example. In the sixth example, a repetitive explanation of the fifth example will be omitted as occasion demands. In the example, each of the vehicle 10 and the charger 20 is connected to the charger position information server 30 and the authentication server 40 via a network. In the example, the position information and the identification information about the charger 20 are transmitted from the charger 20 to the charger position information server 30.

In FIG. 7, the vehicle 10 transmits the certificate of the vehicle 10 (or "certificate (vehicle)") to the charger 20. The charger 20 transmits the certificate of the vehicle 10 to the authentication server 40 via the network. The authentication server 40 confirms the certificate of the vehicle 10, and then transmits a session key to the charger 20. The charger 20 transmits the session key to the vehicle 10.

The charger 20 further transmits the certificate of the charger 20 (or "certificate (charger)") to the authentication server 40 via a wired network. The authentication server 40 confirms the certificate of the charger 20, and then transmits the session key to the charger 20.

After the issuance of the charging start command, the charger 20 transmits the certificate of the charger 20 (or "certificate (charger)") to the vehicle 10. The vehicle 10 applies the signature (or "signature (vehicle) to certificate (charger)") to the certificate of the charger 20.

The vehicle 10 then transmits to the charger 20 the position information about the vehicle 10 with the signature of the vehicle 10 (or "signature (vehicle) to position information") applied thereto, the certificate of the charger 20 with the signature of the vehicle 10 applied thereto, and the certificate of the vehicle 10 (or "certificate (vehicle)").

The charger 20 then applies the signature (or "signature (charger) to position information") to the position information with the signature of the vehicle 10 applied thereto, and applies the signature (or "signature (charger) to certificate (vehicle)") to the certificate of the vehicle 10.

The charger 20 then transmits to the charger position information server 30 the position information with the signature of the vehicle 10 and the signature of the charger 20 applied thereto, the certificate of the charger 20 with the signature of the vehicle 10 applied thereto, and the certificate of the vehicle 10 with the signature of the charger 20 applied thereto.

The present invention, is not limited to the aforementioned embodiments and examples, but various changes may be made, if desired, without departing from the essence or spirit of the invention which can be read from the claims and the entire specification. An information update system and method, a vehicle, a charger and a server apparatus which involve such changes are also intended to be within the technical scope of the present invention.

DESCRIPTION OF REFERENCE NUMERALS 20 vehicle
11 GPS
20 charger
30 charger position information server
40 authentication server

The invention claimed is:

1. An information update system comprising a vehicle on which a battery is mounted, a charger which can charge the battery and which can communicate with the vehicle, and a server apparatus configured to store therein position information associated with the charger, wherein
the vehicle comprising:
a position information obtaining device configured to obtain position information associated with the vehicle when the battery is charged by the charger; and
a vehicle-signature applying device configured to apply signature of the vehicle to the obtained position information associated with the vehicle and charger information which contains identification information associated with the charger and which received from the charger through communication,
the charger comprising:
a charger-signature applying device configured to apply signature of the charger to vehicle information which contains the position information associated with the vehicle and which received from the vehicle through communication,
the vehicle or the charger further comprising:
a transmitting device configured to transmit, to the server apparatus, the charger information with the signature of the vehicle applied thereto and the vehicle information with the signature of the charger applied thereto, and
the server apparatus updates the stored position information on the basis of the charger information with the signature of the vehicle applied thereto and the vehicle information with the signature of the charger applied thereto transmitted by the transmitting device.

2. The information update system according to claim 1, wherein
the vehicle-signature applying device applies a first signature as the signature of the vehicle to the obtained position information associated with the vehicle,
the charger-signature applying device applies a second signature as the signature of the charger to the position information associated with the vehicle with the first signature applied thereto as a part of the vehicle information, and further applies a third signature as the signature of the charger to the identification information associated with the charger,
the vehicle-signature applying device a fourth signature as the signature of the vehicle to the identification information associated with the charger with the third signature applied thereto as a part of the charger information, and the transmitting device transmits, to the server apparatus, the identification information associated with the charger with the third signature and the fourth signature applied thereto, as the charger information with the signature of the vehicle applied thereto, and the position information associated with the vehicle with the first signature and the second signature applied thereto, as the vehicle information with the signature of the charge applied thereto.

3. The information update system according to claim 2, wherein the vehicle-signature applying device further applies a fifth signature as the signature of the vehicle to identification information associated with the vehicle, the charger-signature applying device further applies a sixth signature as the signature of the charger to identification information associated with the vehicle with the fifth signature applied thereto as a part of the vehicle information, and the transmitting device further transmits, to the server apparatus, the identification information associated with the vehicle with the fifth signature and the sixth signature applied thereto as the vehicle information with signature of the charger applied thereto.

4. The information update system according to claim 2, wherein if the charger comprises the transmitting device, the transmitting device as a part of the charger transmits, to the server apparatus, the position information associated with the vehicle with the first signature and the second signature applied thereto, and the identification information associated with the charger with the third signature and the fourth signature applied thereto, via a network, if the vehicle comprises the transmitting device, the transmitting device as a part of the vehicle transmits, to the server apparatus, the position information associated with the vehicle with the first signature and the second signature applied thereto, and the identification information associated with the charger with the third signature and the fourth signature applied thereto, via the network.

5. A vehicle in an information update system comprising the vehicle on which a battery is mounted, a charger which can charge the battery and which can communicate with the vehicle, and a server apparatus configured to store therein position information associated with the charger, said vehicle comprising:

a position information obtaining device configured to obtain position information associated with the vehicle when the battery is charged by the charger;

a vehicle-signature applying device configured to apply signature of the vehicle to the obtained position information associated with the vehicle and charger information which contains identification information associated with the charger and which is received from the charger through communication; and a transmitting device configured to transmit, to the server apparatus, the charger information with the signature of the vehicle applied thereto, the charger information containing position information, which is the position information associated with the vehicle with a signature of the charger applied thereto applied signature of the vehicle by the vehicle-signature applying device.

6. The vehicle according to claim 5, wherein the position information obtaining device has an offset detecting device configured to detect an offset amount between the vehicle and the charger, and the position information obtaining device obtains a value obtained by adding the detected offset amount to coordinates of the vehicle, as the position information associated with the vehicle.

7. The vehicle according to claim 5, wherein the position information obtaining device successively obtains the position information associated with the vehicle, and the position information obtaining device sets latest obtained position information as the position information associated with the vehicle when the battery is charged by the charger, if the position information associated with the vehicle cannot be obtained when the battery is charged by the charger.

8. A charger in an information update system comprising a vehicle on which a battery is mounted, the charger which can charge the battery and which can communicate with the vehicle, and a server apparatus configured to store therein position information associated with chargers, said charger comprising:

a charger-signature applying device configured to apply signature of the charger to vehicle information which contains position information associated with the vehicle with signature of the vehicle applied thereto and which is received from the vehicle through communication; and a transmitting device configured to transmit, to the server apparatus, the vehicle information with the signature of the charger applied thereto, the vehicle information containing identification information associated with the charger, which is the identification information associated with the charger applied signature of the vehicle.

* * * * *